United States Patent Office 3,409,499
Patented Nov. 5, 1968

3,409,499
CHRYSOTILE ASBESTOS FIBER DISPERSION
INCLUDING MONOCARBOXYLIC ACID
William H. Dresher, Warwick, and Alfred W. Naumann, Suffern, N.Y., assignors to Union Carbide Corporation, a corporation of New York
No Drawing. Filed May 14, 1965, Ser. No. 456,005
10 Claims. (Cl. 162—3)

This invention relates to a process for producing stable dispersions of finely divided, chrysotile asbestos. More particularly, the process comprises contacting an aqueous slurry of asbestos fibers with a carboxylic acid and applying high speed shearing forces to the slurry.

Chrysotile asbestos generally occurs in mineral deposits in the form of closely packed bundles of individual fibers. These individual or ultimate fibers (sometimes referred to as fibrils) when separated are of colloid size having diameters of from about 200 to 800 A. and variable lengths of several microns. In aqueous suspension, as well as when dried, the individual fibers have a tendency to become associated into flocs rather than to remain separated. For many commercial uses, however, such as in the manufacture of asbestos filled paper, it is necessary that the individual asbestos fibers remain separated.

Separation of asbestos fiber bundles may be accomplished by various well known dry mechanical processes whereby the closely packed bundles of fibers are physically forced apart. While this technique is relatively successful in separating a substantial portion of the fibers from each other, and at the same time liberating most of the "gangue" or non-asbestos impurities contained in physical mixture with the asbestos, additional purification is required to produce an asbestos product which is substantially free of impurities. Unfortunately, the dry mechanical means, which are conventionally used to open the asbestos fiber bundles, also break up the impurities, thus increasing the difficulty of separating the fine asbestos fibers from the finely ground impurities.

Several techniques have been proposed in the prior art to defibrillate and to chemically disperse asbestos fibers in water suspensions in order to obtain more complete separation of individual fibrils from each other, as well as from the impurities, than is possible by mechanical means alone. Such chemical dispersion techniques are described, for example, in U.S. Patent Nos. 1,907,616; 2,661,287; 2,626,213 and 3,062,701. These prior art techniques have various drawbacks or disadvantages. The processes described in 1,907,616 and 2,661,287 require a large quantity of a soluble metal salt, such as aluminum chloride, to be present in the aqueous asbestos slurry, consequently there is a large quantity of anions, such as chloride ions present in the solution. This tends to limit the amount of asbestos which can be held in suspension, to decrease the stability of the dispersed asbestos and to cause it to flocculate easily. The processes described in 2,626,213 and in 3,062,701 employ organic surfactants for dispersing the asbestos fibers. The process described in 2,626,213 has limited utility in the production of dispersed individual fibers, since mechanical agitation of the surfactant used to aid the fiber separation will cause foaming which cannot be tolerated. The process described in 3,062,701 has been designed to eliminate the foaming, but has the disadvantage that a true dispersion is not formed. Only a temporary dispersion which quickly reverts to a clotted condition is formed.

In our previous application Ser. No. 305,217, filed Aug. 28, 1963, now Patent No. 3,297,516 we described a method by which a stable suspension of chrysotile asbestos can be prepared without encountering the difficulties of the prior art. In accordance with that method, chrysotile asbestos is dispersed and stabilized in aqueous suspension by the use of an auxiliary, highly charged, electropositive colloid containing a metal aluminate and a monobasic acid, which is adsorbed onto the surface of the asbestos fibers. The present invention differs from our previous invention in that the dispersed state herein is created and stabilized by preservation of the natural electropositive (cationic) surface charge of asbestos fibers developed in aqueous suspensions. Thus, while the prior art has been successful in dispersing chrysotile asbestos by enhancing the electrostatic charge of the mineral, it has not heretofore been known how to disperse asbestos by preserving the natural charge which the mineral itself is capable of generating. This method has the advantage of avoiding contamination of the asbestos with metal ions or hydrolysis products which may cause undesirable results in the end products.

It is an object of this invention to produce a stable suspension of finely divided chrysotile asbestos fibers which maintain their natural cationic or electropositive surface charge. It is another object of this invention to produce a dry purified asbestos product composed of finely divided chrysotile asbestos fibers which are easily redispersible in water. It is still another object of this invention to purify asbestos by a process which includes the step of dispersing asbestos fibers by means of a carboxylic acid alone.

One aspect of this invention consists of a process comprising contacting an aqueous slurry containing from about 0.5–5% chrysotile asbestos with a sufficient amount of a water-soluble, monocarboxylic acid having up to 6 carbon atoms to maintain a pH of 3.8 to 6.3 and applying high speed shearing forces to the slurry. It is critical that the water which is used in making up the asbestos slurry contain no more than about 100 p.p.m. of monovalent anions and no more than about 10 p.p.m. of multivalent anions both of which constitute interfering anions. Deionized or distilled water meets these requirements.

According to the present invention, the chrysotile asbestos to be treated need not be previously opened; however, some amount of prior opening is desirable. Any of the well known techniques for opening asbestos can be employed. The asbestos can be opened either before it is added to the water, or after the asbestos slurry is formed. Preferably, the asbestos employed should be grade 5 to grade 7 according to the Quebec Asbestos Producers Association Classification. Sufficient asbestos is added to water to prepare an asbestos-water slurry containing from about 0.5 to 5 weight percent chrysotile asbestos. If the slurry contains less than 0.5 weight percent asbestos, the resulting asbestos dispersion will be too dilute for economical processing, even though technically feasible. When the slurry contains more than about 5 weight percent asbestos, the viscosity increases greatly, and the slurry becomes too difficult to handle. Preferably the slurry contains from about 0.1 to about 4.0 weight percent chrysotile asbestos.

The asbestos slurry is then contacted with a monocarboxylic acid and mixed at high shear. The acid is preferably added to the asbestos-water slurry, but alternatively the acid can be present in the water to which the asbestos is added. The amount of acid employed is governed by several factors in the system, such as the amount of acid-soluble, non-chrysotile impurities in the asbestos and the degree of ionization of the acid in aqueous solution. The amount of acid required is also governed by the concentration of interfering anions in the water used to prepare the asbestos slurry, the average fiber length of the asbestos, and the pulp density of the asbestos dispersion.

The minimum pH at which dispersion occurred was 3.8 and the maximum pH was 6.3. A pH below the minimum of 3.8 does not result in satisfactory asbestos dispersions, while a pH in excess of 6.3 results in excessive foaming.

An alternative operational procedure is to apply mechanical energy to the slurry, containing the required amount of acid, at a solids concentration of up to approximately 8 to 10% asbestos and then to dilute the slurry to the range of 0.5 to 5.0% while applying an additional but smaller amount of mechanical energy to the system. In this case, the amount of acid required will be the same as if the dispersing had been done at the final slurry concentration.

The acids which are useful in the process of this invention are water soluble, monocarboxylic acids having up to 6 carbon atoms. The acid may be saturated or unsaturated and substituted or unsubstituted. Illustrative useful acids include formic, acetic, propionic, butyric, valeric, acrylic, crotonic, methacrylic, lactic, angelic, pyruvic and tiglic. The first three listed are preferred. Acids containing more than 6 carbon atoms are not useful because they cause excessive foaming. Inorganic acids, such as hydrochloric acid, nitrous acid, nitric acid, sulfuric acid, phosphoric acid, etc.; and polycarboxylic acids such as oxalic acid, malonic acid, maleric acid, tartaric acid, citric acid, etc., are not useful within the scope of this invention due to their strong interaction with the charged surface of the asbestos causing dispersions thereof to be very unstable.

In adding the acid to the asbestos slurry it is advantageous to add the acid concurrently or just prior to the application of mechanical energy to the systems. In so doing a minimum amount of acid is consumed in leaching the asbestos itself. Similarly, there is some advantage to adding the acid in dilute form rather than in a concentrated form in order to avoid localized high concentrations of acid. The dispersing process is extremely sensitive to the presence of soluble salts in the asbestos slurry at the time of dispersing. Likewise, the stability of the dispersion, once formed, is extremely sensitive to the presence of soluble salts. The effect of the presence of soluble salts is to decrease the stability of an asbestos dispersion. In order to maintain a stable asbestos dispersion for relatively long periods of time, it is desirable that the asbestos slurry contain minimal amounts of monovalent anions and negligible amounts of multivalent anions, such as sulfate ions, since such anions tend to flocculate the asbestos dispersion. Stability of an asbestos dispersion is measured in terms of the time for which the viscosity of the dispersion remains at a relatively low value, in the order of 1–10 centipoises at 25° C.

Mechanical energy in the form of high speed shearing forces must be applied to the asbestos-water-organic acid slurry in order to attain satisfactory defibrillation and subsequent dispersion of the asbestos fibers. The mechanical agitation can be accomplished with any device capable of rendering a high proportion of its energy into shearing forces. Suitable laboratory equipment includes a Waring Blendor, the Wemco Attrition Mill, the Brookfield Counter-Rotating Mixer, the Vir-tis Homogenizer, as well as other colloid mills. Ultrasonic "cleaning" equipment can also be used for this purpose. In commercial practice, machines such as the conventional papermaker's disintegrators, beaters and refiners, such as the Valley Beater, the Jordon Engine, and the Clafin Refiner can be employed. Also, machines well known in the mineral processing industry which provide both impact and attrition action, such as a wet hammermill, the Fitzpatrick Comminution Machine, Micro-Pulverizer, or even a conventional ball mill, can be employed. It is preferable that the agitation of the asbestos-water-organic acid slurry be limited to interfiber comminution, in order to preserve the ultimate fiber size distribution which is native to the asbestos ore, and to prevent further size reduction of the fibers. This will also tend to limit size reduction of the impurities, improving the ease with which the dispersed asbestos is separated from the impurities.

Stable dispersions of chrysotile asbestos prepared according to the present invention have a viscosity of from about 1 to about 10 centipoises at 25° C. In this state, a dispersion of asbestos exhibits a characteristic "shimmer" or "pearlescent" appearance due to the reflection of light from the alignment of the asbestos fibers in suspension. The quality of a dispersion can be determined by measuring the viscosity of the dispersion and recording the viscosity reading as a function of time. The lower the initial viscosity reading and the longer this reading remains substantially constant, the better is the dispersion. The viscosity relationships of an asbestos dispersion are functions of the particular dispersing reagents employed, the pH of the dispersion, the kind and amount of anions present and the concentrations and grade of asbestos employed.

The stability of asbestos dispersions is expressed in terms of "gel-time" which is defined as the time it takes for a low viscosity asbestos dispersion to reach a viscosity which is out of the "dispersed" viscosity region and in the "gel" viscosity region. The transition from the dispersed state to the gel state is marked by a sudden and continuous rise in viscosity with an eventual leveling off in the region above 50 centipoises at 25° C. Having reached the gel-point, the asbestos suspension loses the shimmer which is characteristic of asbestos in the dispersed form, it acquires a homogeneous, static appearance. The gel can range in viscosity to the point at which it cannot be poured from a container. The amount of mechanical energy which has been applied to the system during dispersion has little effect on the viscosity of the dispersed phase.

Asbestos dispersions prepared in accordance with the present invention are useful per se as a source of finely divided asbestos. These dispersions can be used as additives to cellulosic paper to improve its softness as well as to aid in retention of inorganic fillers.

Another aspect of this invention involves the formation of an asbestos dispersion according to the above-described methods as a step in the purification of asbestos containing finely divided impurities such as magnetite. These impurities may readily be separated from asbestos which has been dispersed in water by gravity methods, such as settling followed by decantation of the stable asbestos dispersion, or by the use of conventional continuous thickeners, centrifuges or hydrocyclones.

The resulting purified asbestos dispersion can be used "as is" or the asbestos can be flocculated, filtered and dried. Flocculated asbestos can be used in conventional asbestos products requiring short fiber asbestos, such as a filler in plastic products.

Flocculation of the asbestos dispersion may be accomplished by adjusting the pH of the dispersion outside of the range of 3.8–6.3 which is the range within which the dispersion is stable. A state of flocculation exists when two phases become obvious—a clear solution phase and a curd-like gel phase. The flocculated asbestos is far easier to filter than is the asbestos dispersion or gel.

Any form of chrysotile asbestos can be employed in the present invention. The preferred type, however, is short fiber material obtained from deposits near Coalinga, Calif. Asbestos mined at this location is short fibered chrysotile asbestos which would be classified as grade 7 according to the Canadian Standards Classification.

In order to more fully described the present invention, the following examples are given by way of illustration only and are not intended to limit the scope of the invention.

EXAMPLE 1

Three hundred milliliters of deionized water were placed in the glass container of a Waring Blendor. Six grams of mechanically opened chrysotile asbestos fiber were added to the water, then 3.0 milliliters of 1.0 molar acetic acid solution were added to the asbestos-water mixture. The blender was turned on at high speed (about 10,000 r.p.m.) and allowed to run for three minutes. The resulting asbestos dispersion was poured into a 300 milliliter tall-form beaker. It was noted that the asbestos dispersion had a pearlescent shimmer. This dispersion had a viscosity of 2.7 centipoises at 25° C. (as measured by a Brookfield Type LVF viscosimeter using a No. 1 spindle at 60 r.p.m.) and a pH of 4.5. Within thirty minutes after the dispersion had been prepared, small dark particles settled out of the dispersion.

The asbestos dispersion was decanted away from the settled residue into a second beaker. The residue remaining in the first beaker, which had a gritty feel, was greenish brown in color and contained small black specks of magnetite. A portion of the decanted dispersion was flocculated by the addition of a few drops of 10 weight percent sodium sulfate solution. The flocculated suspension was vacuum filtered to form a matted asbestos filter cake, which was removed from the filter in a coherent mass and dried. The dry material had a brightness of 75 percent as compared to a standard magnesite block, using light having a wave length of 457 millimicrons.

The remainder of the decanted suspension was centrifuged at 1000 r.p.m. for five minutes. The supernatant liquid was decanted and flocculated by the addition of a few drops of dilute sodium sulfate solution. The flocculated suspension was vacuum filtered to form a matted asbestos cake which was removed from the filter in a coherent mass and dried. The dry cake had a brightness of 85 percent when measured in the same manner as above. The high brightness of the asbestos indicates a very high degree of purity.

EXAMPLE 2

Three hundred milliliters of deionized water were placed in the glass container of a Waring Blendor. Three grams of mechanically opened chrysotile asbestos fiber were added to the water, and then 1.0 milliliter 1.0 mole lactic acid solution was added to the asbestos-water mixture which was then blended at high speed for three minutes. The resulting asbestos dispersion was poured into a 300 milliliter tall-form beaker. It was noted that the asbestos dispersion had a pearlescent shimmer. This dispersion had a viscosity of 1.0 centipoise at 25° C. (as measured by a Brookfield Type LVF viscosimeter using a No. 1 spindle at 60 r.p.m.) and a pH of 4.5. Within thirty minutes after the dispersion had been prepared, small dark particles settled out of the dispersion.

EXAMPLE 3

Three hundred milliliters of deionized water were placed in the glass container of a Waring Blendor. Three grams of mechanically opened chrysotile asbestos fiber were added to the water, and then ½ milliliter of 1.0 molar butyric acid solution was added to the asbestos-water mixture. The mixture was blended at high speed for three minutes. The resulting asbestos dispersion was poured into a 300 milliliter tall-form beaker. It was noted that the asbestos dispersion had a pearlescent shimmer. This dispersion had a viscosity of 1.0 centipoise at 25° C. (as measured by a Brookfield Type LVF viscosimeter using a No. 1 spindle at 60 r.p.m.) and a pH of 5.5. Within thirty minutes after the dispersion had been prepared, small dark particles settled out of the dispersion.

What is claimed is:

1. An aqueous dispersion having a pH of from 3.8 to 6.3 comprising from about 0.5 to 5.0 weight percent finely divided chrysotile asbestos fibers, and as the sole dispersing and stabilizing agent, a water-soluble, monocarboxylic acid containing up to 6 carbon atoms.

2. The composition of claim 1 wherein the dispersion has a viscosity of about 1 to 10 centipoises at 25° C.

3. The composition of claim 1 wherein the asbestos fibers in said dispersion are characterized by having an electropositive surface charge.

4. The composition of claim 1 wherein the monocarboxylic acid is selected from the group consisting of formic acid, acetic acid and propionic acid.

5. The dried residue of the dispersion of claim 1.

6. A process for the preparation of a stable aqueous dispersion of finely divided chrysotile asbestos fibers which comprises:
   (1) contacting a slurry of chrysotile asbestos in water containing no more than 100 p.p.m. of monovalent anions and no more than 10 p.p.m. of multivalent anions with sufficient water-soluble, monocarboxylic acid containing up to 6 carbon atoms to cause the slurry to have a pH of from 3.8 to 6.3, and
   (2) applying high speed shearing forces to said slurry.

7. The process of claim 6 wherein the carboxylic acid is selected from the group consisting of formic acid, acetic acid and propionic acid.

8. The process of claim 6 wherein the aqueous slurry contains from about 0.5 to 5 weight percent asbestos.

9. The process of claim 6 wherein the water used to prepare the slurry is deionized water.

10. The process of claim 6 wherein the water used to prepare the slurry is distilled water.

References Cited

UNITED STATES PATENTS

| | | | |
|---|---|---|---|
| 2,661,287 | 12/1953 | Barbaras | 162—155 |
| 2,685,825 | 8/1954 | Novak | 162—3 |
| 2,759,813 | 8/1956 | Feigley | 162—155 |
| 2,940,892 | 6/1960 | Feigley | 162—155 X |
| 3,297,516 | 1/1967 | Naumann | 162—3 |

DONALL H. SYLVESTER, *Primary Examiner.*